Figure 1:
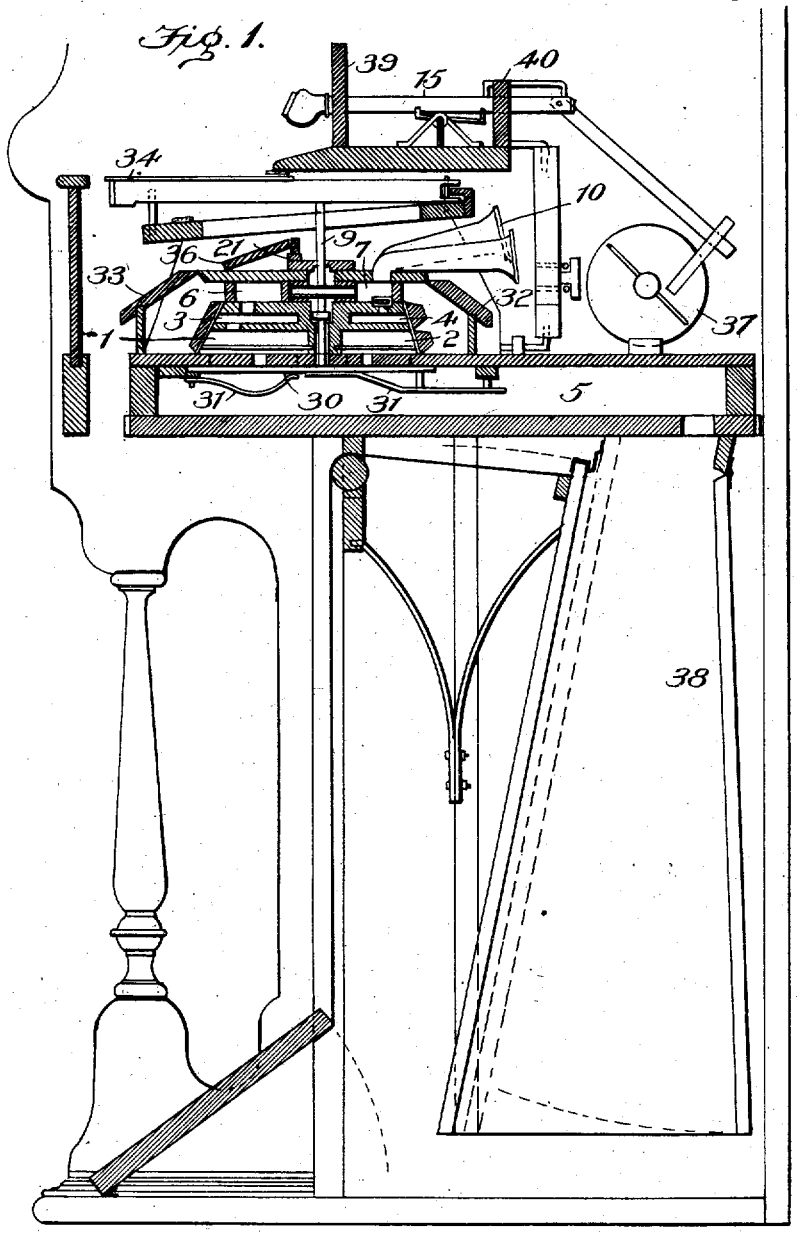

No. 12,670. REISSUED JULY 9, 1907.

J. R. ENGLAND.

REED ORGAN.

APPLICATION FILED NOV. 17, 1906.

4 SHEETS—SHEET 1.

Witnesses:-
B. J. Lorkowski.
Edwin L. Bradford

Inventor,
J. R. England
By A. D. Jackson,
Attorney

THE NORRIS PETERS CO., WASHINGTON, D. C.

No. 12,670. REISSUED JULY 9, 1907.

J. R. ENGLAND.

REED ORGAN.

APPLICATION FILED NOV. 17, 1906.

4 SHEETS—SHEET 2.

Witnesses:-
B. J. Sikowski
Edwin L. Bradford

Inventor,
J. R. England
By A. D. Jackson
Attorney

THE NORRIS PETERS CO., WASHINGTON, D. C.

No. 12,670. REISSUED JULY 9, 1907.

J. R. ENGLAND.

REED ORGAN.

APPLICATION FILED NOV. 17, 1906.

4 SHEETS—SHEET 3.

Witnesses:-
B. J. Lorkowski
Edwin L. Bradford

Inventor:
J. R. England.
By A. L. Jackson,
Attorney.

THE NORRIS PETERS CO., WASHINGTON, D. C.

No. 12,670. REISSUED JULY 9, 1907.
J. R. ENGLAND.
REED ORGAN.
APPLICATION FILED NOV. 17, 1906.
4 SHEETS—SHEET 4.
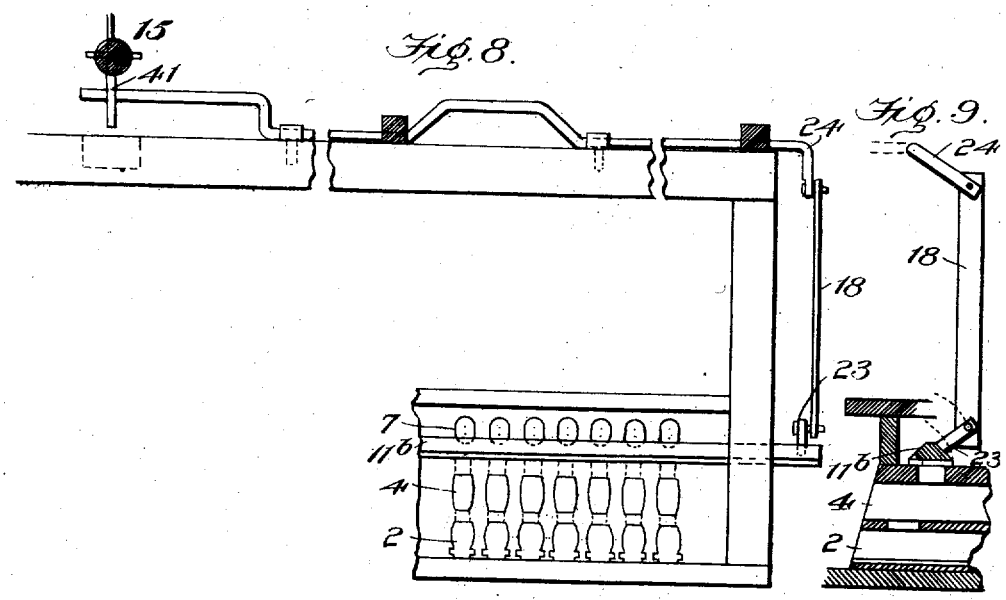
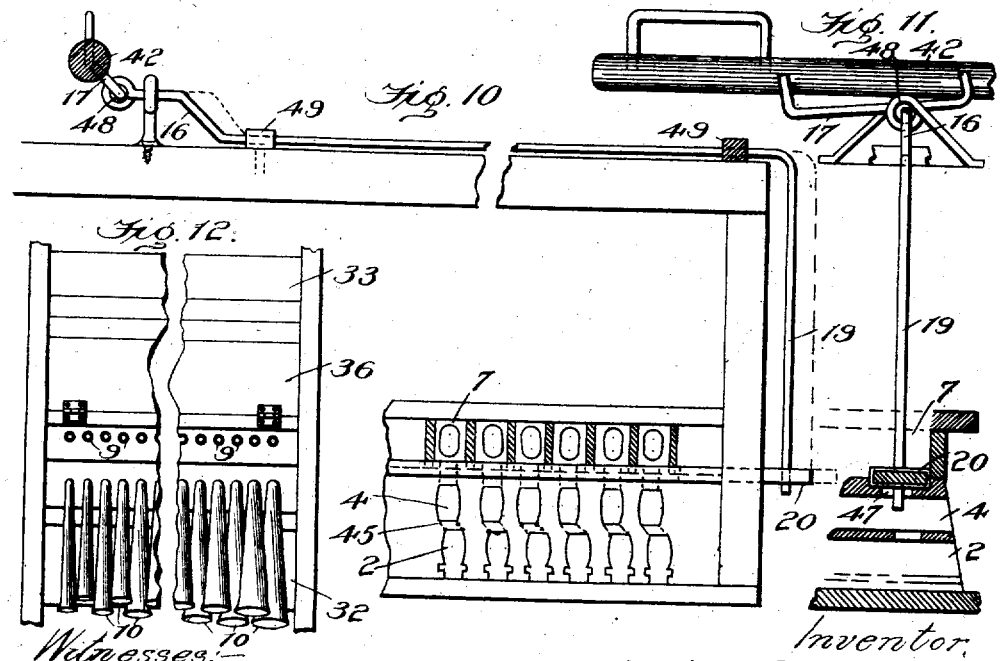
Witnesses:
B. J. Lotkowski
Edwin L. Bradford
Inventor:
J. R. England.
By A. D. Jackson,
Attorney.
THE NORRIS PETERS CO., WASHINGTON, D. C.

UNITED STATES PATENT OFFICE.

JAMES R. ENGLAND, OF DALLAS, TEXAS, ASSIGNOR TO ENGLAND ORGAN & PIANO COMPANY, OF HOUSTON, TEXAS, A CORPORATION OF TEXAS.

REED-ORGAN.

No. 12,670. Specification of Reissued Letters Patent. Reissued July 9, 1907.

Original No. 828,726, dated August 14, 1906. Application for reissue filed November 17, 1906. Serial No. 343,943.

*To all whom it may concern:*

Be it known that I, JAMES R. ENGLAND, a citizen of the United States, residing at Dallas, Texas, have invented certain new and useful Improvements in Reed-Organs, of which the following is a specification.

This invention relates to organs, and more particularly to improvements in reed-organs; and the object is to improve the reed-organs so that the reed-organs will give the same effect as the ordinary reed-organs and will also accomplish approximately the same results as pipe-organs.

The improvements will give greater volume to the tones and make it possible to obtain results never before accomplished on the reed-organs. Resonance-cells are superposed above the usual reed and resonance cells both at the front and rear—that is, above the front reed-cells and above the rear reed-cells—and the front and rear superposed resonance-cells are connected by oval tubes, and graduated horns are connected with the rear superposed resonance-cells.

The object of the superposed resonance-cells and the horns is to purify or perfect the tone of the organ. These improvements tend to relieve the tones of the metallic sounds of the reeds so that clearer or more perfect tones and more volume are obtained. In other words, the improvements increase both the sonority and volume of the tones.

The invention involves the superposing of resonance-cells above the ordinary resonance-cells and reed-cells of the parlor or reed organ both at the front and the rear and connecting the front and rear resonance-cells by suitable tubes, providing suitable valves for these cells and providing and connecting graduated horns or trumpets to the rear resonance-cells. The horns are to be of different sizes to correspond with the different reeds, and the horns are to be made of suitable sonorous metal.

Other objects and advantages will be fully explained in the following description, and the invention will be more particularly pointed out in the claims.

Reference is had to the accompanying drawings, which form a part of this application and specification.

Figure 2:
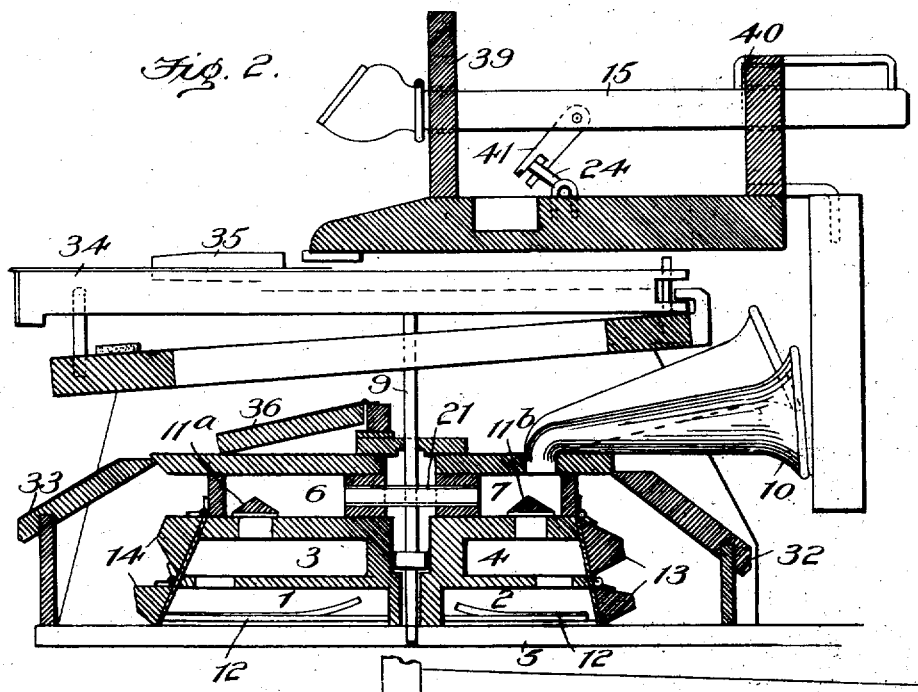
Figure 3:
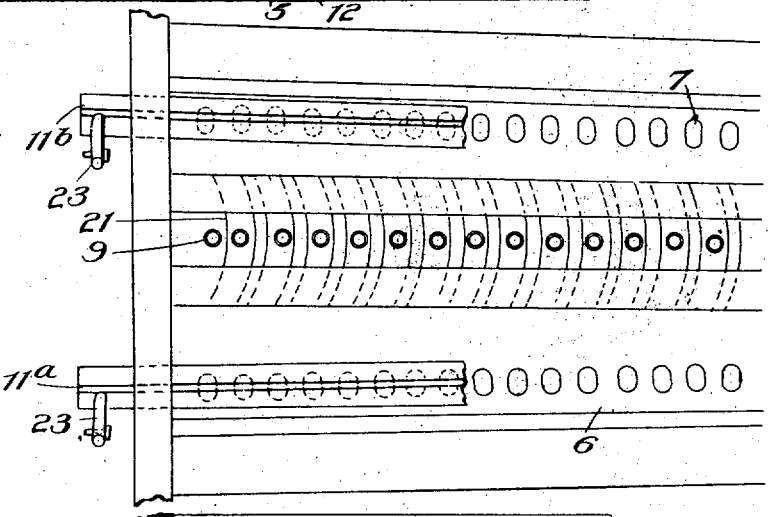
Figure 4:
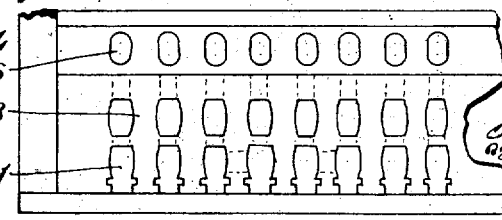
Figure 5:
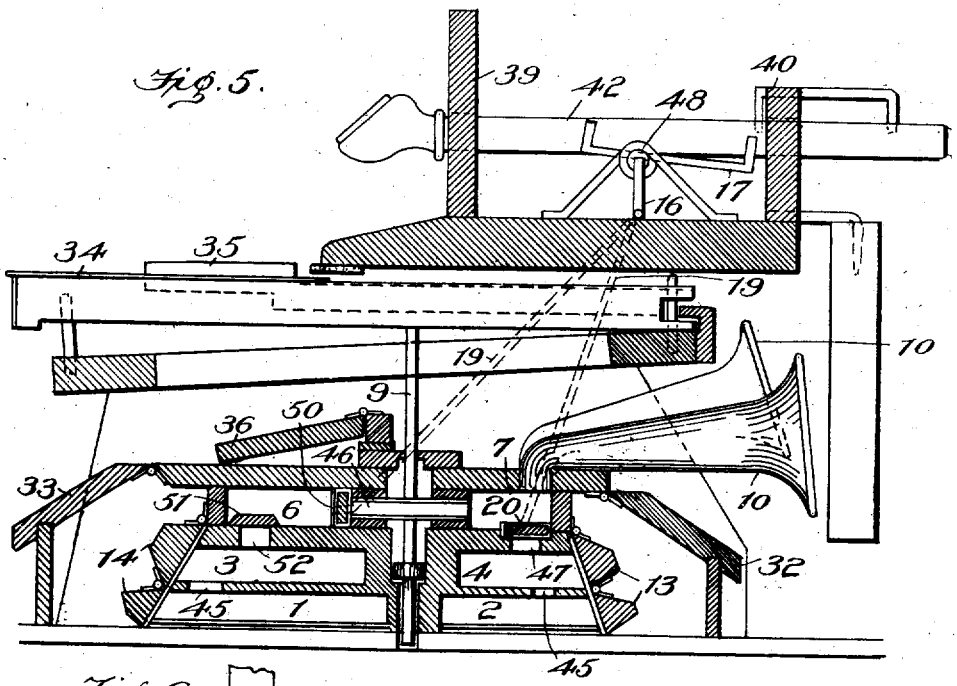
Figure 6:
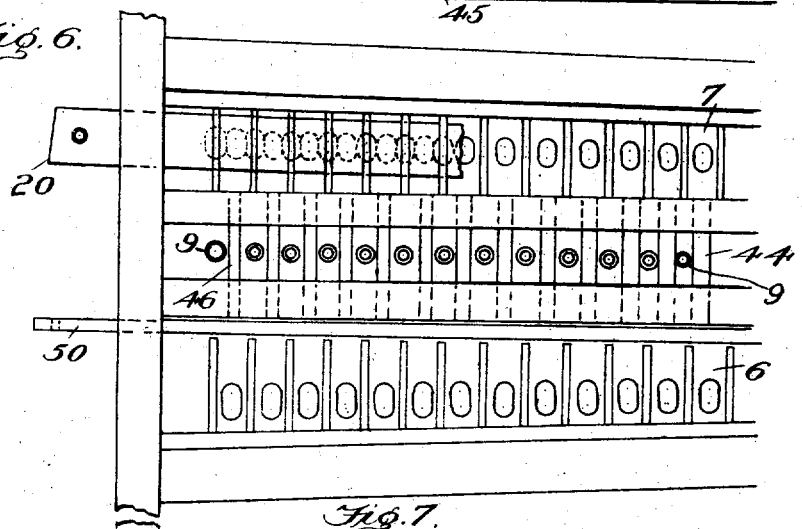
Figure 7:
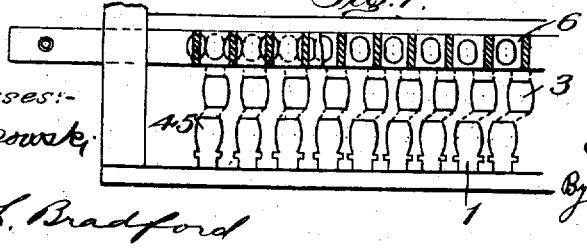

Figure 1 is a vertical section of a reed-organ, the upper part of the casing being broken away. Fig. 2 is a vertical section, on a larger scale than Fig. 1, of the reed and resonance-cells and the adjacent parts. Fig. 3 is a broken plan view of the parts of the organ which contain the reed and resonance-cells. Fig. 4 is a broken elevation of the same part. Fig. 5 is a similar view to Fig. 2, showing a modification in the resonance-cells and the valves therefor. Fig. 6 is a similar view to Fig. 3, illustrating the modification in the tubes connecting the rear and the front resonance-cells. Fig. 7 is a broken elevation of the same, the view being similar to Fig. 4. Fig. 8 is an elevation of the stop-action for operating the valves of the resonance-cells, such as are shown in Fig. 2. Fig. 9 is a side elevation of the stop-action and a cross-section of a portion of a resonance-cell and its valve, the views in the last two figures showing mechanism for operating hinged valves. Fig. 10 is an elevation of the stop-action for operating sliding valves for the resonance-cells. Fig. 11 is a side elevation of the same and a broken cross-section of the resonance-cell and its valve. Fig. 12 is a plan view of a portion of the organ, illustrating the horns.

Similar characters of reference are used to indicate the same parts throughout the several views.

No change is made in the operation of the reeds which are operated by a current of air furnished either by a suction-bellows or by a blowing-bellows.

A suction-bellows is illustrated in the drawings.

In the drawings there is shown an air-chest 5, in which are located valves 30, which are in operation pressed downward or opened by the tracker-pins 9. Springs 31 normally hold the valves 30 closed.

1 indicates the front reed-cells, ranging from bass to treble, comprising five octaves, from F to F.

2 indicates the usual rear set of reed-cells, which are one octave higher in tone than cells 1. There may be any number of reeds with their respective cells either above or below the diapason pitch.

3 and 4 indicate the usual resonance-cells above the reed-cells and these cells are provided with valves $11^a$ and $11^b$, which are operated by stop-action hereinafter described. Above the resonance-cells 3 and 4 are the superposed resonance-cells 6 and 7, front and rear, respectively. The cells 6 and 7 have communication by tubes 21, which must be curved, as shown in Fig. 3, when the vibration-cells 6 and 7 and the resonance-cells 3 and 4 are respectively directly above the reed-cells 1 and 2.

A variation in the arrangement of the superposed resonance and resonance-cells is shown in Figs. 5 to 7 of the drawings, which are connected by straight oval tubes to be explained hereinafter. When the resonance-cells are directly above the reed-cells, the tubes 21 must be curved to pass by the tracker-pins or valve-pins 9. A series of horns 10, graduated from bass to treble, are connected to the superposed resonance-cells 7. The valves $11^a$ and $11^b$ regulate and control the admission of the air to the horns 10 by closing the resonance-cells 3 and 4 and opening the same at proper intervals. No change is made in the manner of operating the swells 32 and 33, the mutes 13 and 14, the keys 34 and 35, the coupler-board 36, the tremolo 37, or the bellows 38. These parts of the organ are in common use and will not be particularly described. The usual reeds 12 are also used with the improved organ. The stop-action shown in Figs. 2, 8, and 9 is similar to the stop-action in common use. The stop 15 is mounted in and has sliding motion in the boards 39 and 40. The stop 15 operates the rocking lever-rod 24 by means of the arm 41. The lever-rod 24 is pivotally connected to the link-bar 18. Link-bar 18 is pivotally connected to a pin 23, which has one end inserted in the valve $11^b$. When the stop is moved, the rod 24 is rocked and the valve is operated or closed.

In Figs. 5 to 7 and 10 and 11 some modifications are shown in the arrangement of the resonance and superposed resonance-cells and the tubes connecting the front and rear superposed resonance-cells and modifications in the valves and the stop-action for the valves are shown. The resonance-cells 3 and 4 and the superposed resonance-cells 6 and 7 are offset relative to the reed-cells 1 and 2, respectively. The openings 45 between the cells 1 and 3 and between cells 2 and 4, respectively, will be slanting, as shown in Figs. 7 and 10. With such arrangement the tubes 46, connecting cells 6 and 7, may be straight instead of curved. The tubes 21 (shown in Figs. 2 and 3) are curved, so that they will not interfere with the valve-pins 9. A slide-valve 20 has openings to register with the openings 47 instead of the hinged valve $11^b$, previously shown. Stop-action is provided to give lateral motion to this valve 20. A stop 42, operating in boards 39 and 40, carries a bracket 17, set at an angle to the stop. A sliding rod 16 has an eye 48 engaging the bracket 17 and operates through blocks 49. This rod has a portion 19 bent down at the side of the cells and inserted in the valve 20. When the stop 42 moves, the bracket 17 will give lateral motion to the valve 20. A slide-valve 50 is provided for opening and closing the tubes 46. A stop-action similar to the stop-action for valve 20 is provided for valve 50. A valve 51 may also be provided for closing the openings 52. This valve may be used for creating variations in tones.

Having fully described my invention, what I claim as new, and desire to secure by Letters Patent, is—

1. A reed-organ having a series of reed-cells, a series of resonance-cells each having a reed-cell communicating therewith, a series of horns connected with said resonance-cells, and a valve for opening and closing the communication between each reed-cell and the coacting resonance-cell.

2. A reed-organ having a series of reed-cells, a series of resonance-cells each having communication with one of said reed-cells, a valve for opening and closing the communication of each reed-cell with its coacting resonance-cell, a series of graduated horns connected to said resonance-cells, and suitable stop-action for actuating said valves.

3. A reed-organ having a series of graduated reeds and cells therefor, means for supplying air to said reeds, resonance-cells each in communication with one of said reed-cells, graduated horns connected to said resonance-cells, and a valve for opening and closing the connection between each reed-cell with its coacting resonance-cell.

4. A reed-organ having a front and a rear series of reeds and front and rear cells therefor, means for supplying air to said reeds, a front and a rear series of resonance-cells respectively in communication with said reed-cells, a front and a rear series of superposed resonance-cells respectively in communication with said first-named resonance-cells, a tube connecting each front superposed resonance-cell with its coacting rear superposed resonance-cell, and a series of graduated horns connected to the rear superposed resonance-cells.

5. A reed-organ having a front and a rear set of reed-cells, reeds operating in said cells, means for supplying air to said reeds, front and back superposed resonance-cells respectively in communication with said reed-cells, a tube connecting each front superposed resonance-cell with its coacting rear superposed resonance-cell, and graduated horns connected to said rear cells.

6. A reed-organ having a series of reed cells, a series of resonance cells each having a reed-cell communicating therewith, superposed resonance cells in communication with said resonance cells, and a series of horns connected with said superposed resonance cells.

7. A reed-organ having a front and a rear set of reed-cells, reeds operating in said cells, means for supplying air to said reeds, front and rear resonance-cells respectively in communication with said reed cells, a tube connecting each front resonance cell with its co-acting rear resonance cell, and graduated horns connected to said rear resonance-cells.

In testimony whereof, I have set my hand in the presence of two witnesses, this 16th day of October, 1906.

JAMES R. ENGLAND.

Witnesses:
A. L. JACKSON,
MARY CARTER.